Aug. 5, 1947.        D. J. WARD        2,425,289
TACHOMETER CALIBRATOR
Filed Jan. 20, 1944        4 Sheets-Sheet 1

DELBERT J. WARD.
INVENTOR.

BY Edwin Coater
ATTORNEY

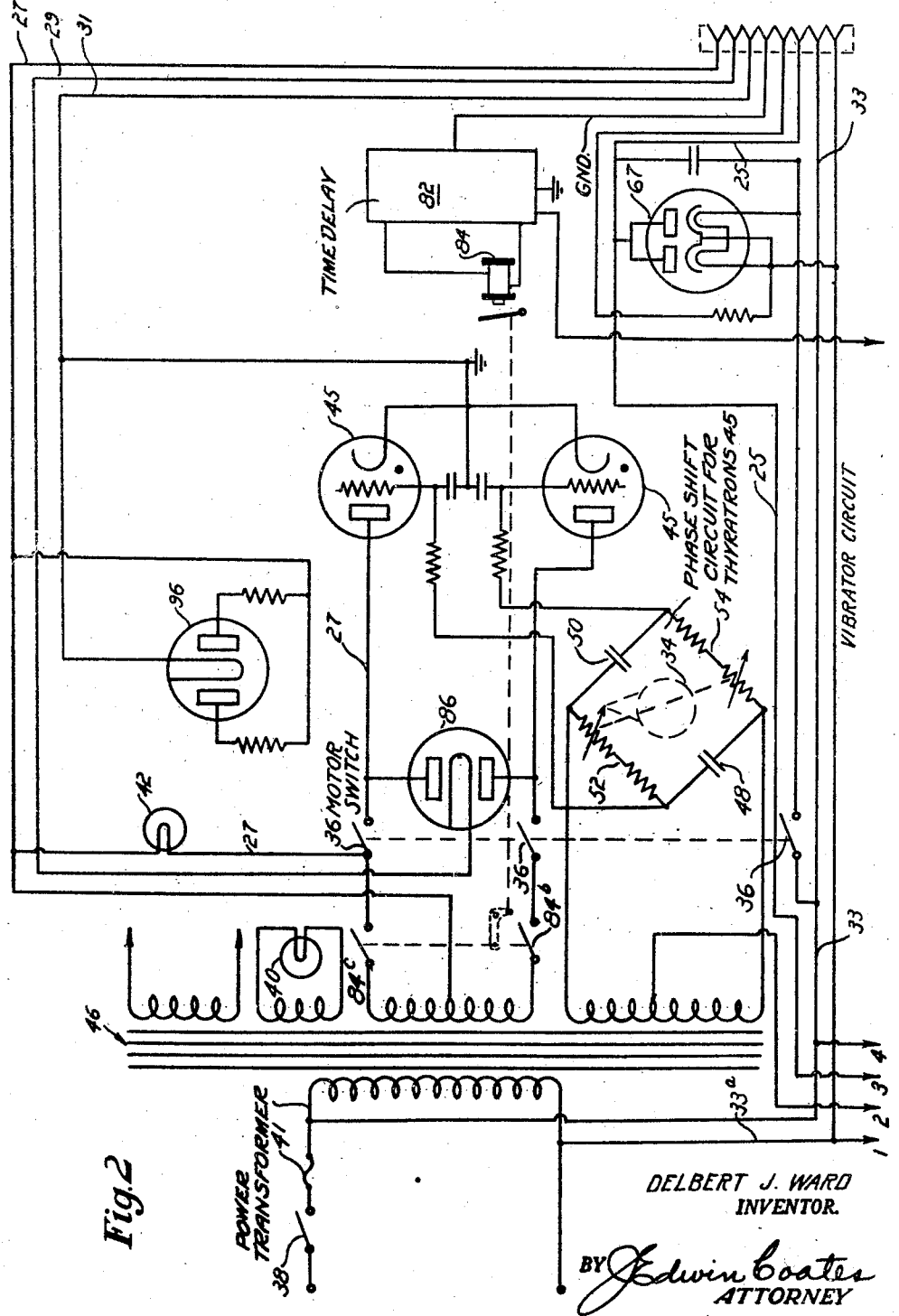

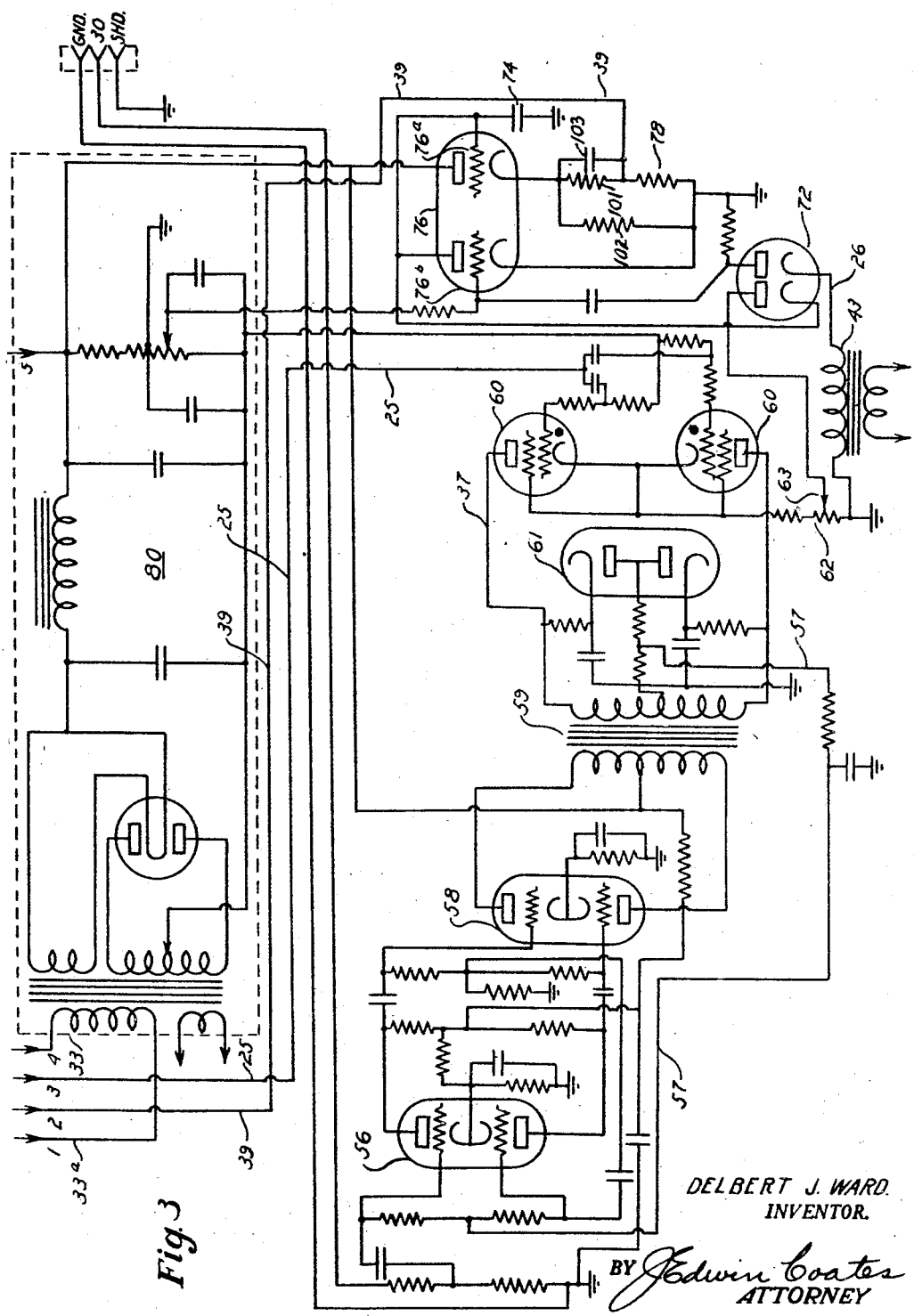

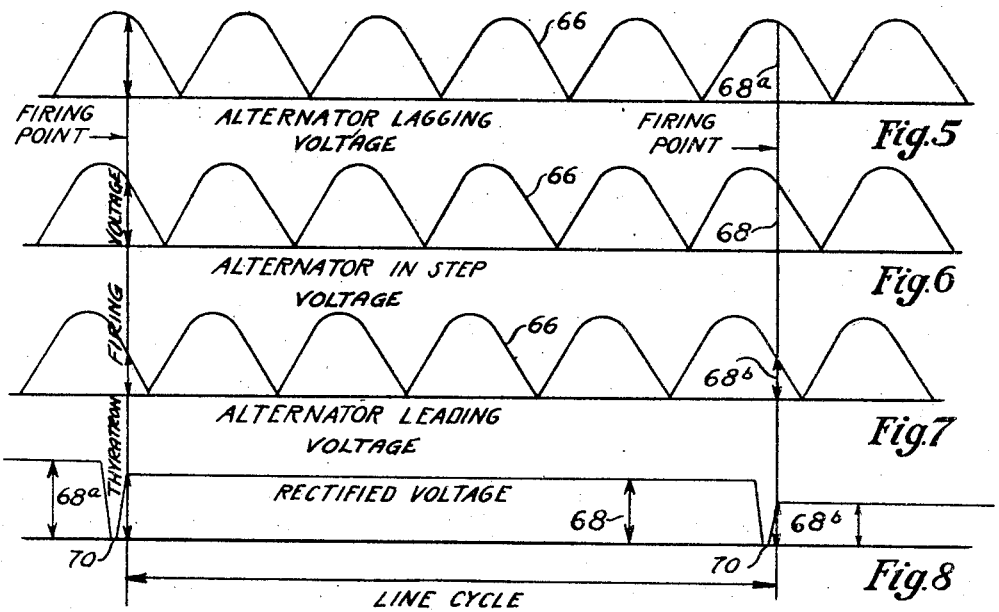
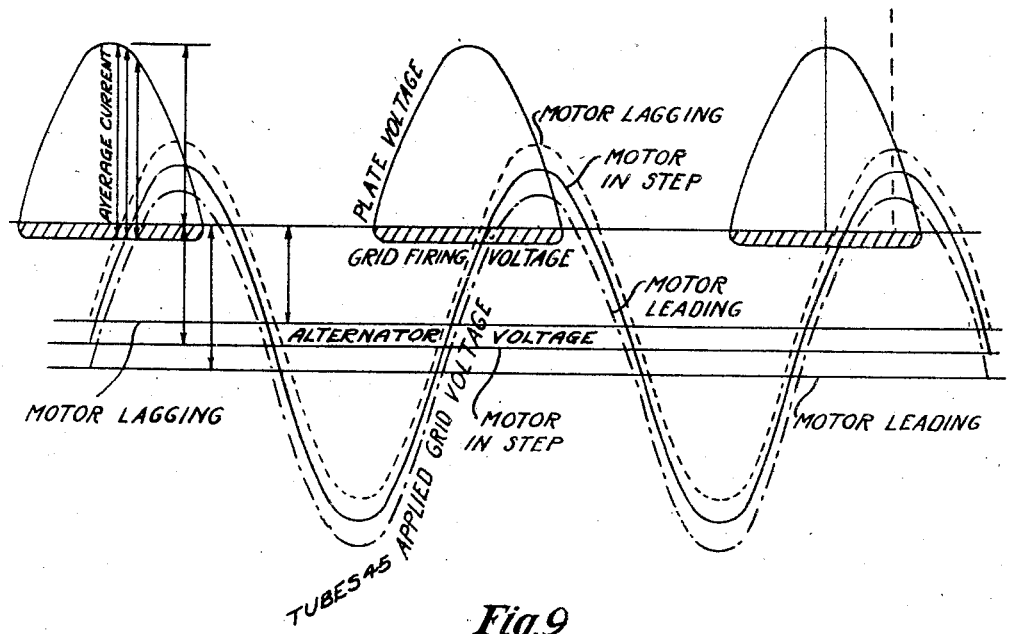

Patented Aug. 5, 1947

2,425,289

UNITED STATES PATENT OFFICE 2,425,289

TACHOMETER CALIBRATOR

Delbert J. Ward, Sherman Oaks, Calif., assignor to Douglas Aircraft Company, Inc., Santa Monica, Calif.

Application January 20, 1944, Serial No. 519,039

26 Claims. (Cl. 73—2)

This invention relates to a method of, and means for, adjusting the speed of a D. C. motor, or other electrically operated mechanism, and locking it in synchronism with the frequency of an A. C. power line from which it is supplied with power through the agency of electronic means.

While the invention may be utilized in a wide number of industrial applications, it is herein particularly described, by way of example, as applied to a novel machine for calibrating tachometers or revolution counters.

Tachometers are used to measure the speed of engine shafts and, when used on airplane engines, are positioned in the engine compartment or nacelle, operating under severe conditions of extreme variation in temperature and humidity, and continuous vibration. The accuracy of the instruments is a matter of importance as, for instance, in synchronizing the speed of the engines of a multi-engine airplane, or when making test flights of a plane from which the performance of of the plane will be calculated.

The invention is described and illustrated as embodied in calibration apparatus for tachometers of all types, but particularly of the electrical type in which the instrument comprises a small electric generator, directly driven by the engine shaft, or engine cam shaft, and connected by an electric cable to an indicator unit, mounted in the pilot's compartment. The indicator is constructed as a voltmeter in which the voltage of the generator output is shown in revolutions per minute, which correlation is exact, since the voltage of the generator output varies directly as the speed of revolution of the generator.

In tachometer calibration equipment used hitherto, use has been made of a synchronous speed motor with mechanical means for varying the speed of a driven shaft to which the generator unit of the tachometer of the type described is attached or of an adjustable speed motor with direct drive to the tachometer, but the mechanical means for varying the speed of the driven shaft is not satisfactory, and the only check of the accuracy of the tachometer being tested is by a reference tachometer, the readings of which may not be exactly accurate since such instruments are liable to lose their initial accuracy owing to electrical or mechanical defects which develop with use over a period of time.

It is the general object of the invention to provide a method of, and means for, operating a D. C. motor, or other direct current operated mechanism, so that the speed may be set to any desired value by predetermined increments having a direct relation to the frequency of the line, and instantly brought into synchronism with the frequency of the A. C. supply line at that speed, being thereafter automatically held in synchronism until it is desired to again change the speed of the motor or other mechanism.

It is an object of the invention to provide operating means for a D C. motor, or other direct current operated mechanism, including grid controlled electronic means operated from an A. C. line to provide the power for driving the D. C. motor, and to furnish an A. C. voltage provided by a small alternator mounted on the motor shaft, to control electronic means responsive to any phase difference between the frequency of the voltage generated by the alternator and of the line supply to apply a correcting voltage to the grids of said electronic power supplying means to bring the speed of the motor to the desired value.

A further object of the invention is to provide grid controlled electronic means operated by an A. C. line to drive a D. C. motor, or other direct current operated mechanism, having combined manual and automatic means for changing the speed of said motor, the manual means acting to vary the grid potential of said electronic means to change the output thereof and thereby bring the speed of the D. C. motor approximately to a desired value, and the automatic means acting to bring the speed of the motor into synchronism with the line and thereafter to maintain said synchronism.

A still further object of the invention is to provide grid controlled electronic means operated by an A. C. line to drive a direct current motor, or other direct current operated mechanism, and combined manual and automatic means to change the speed of said motor and bring the speed of the motor into synchronism with the frequency of the line, having combined visual and electronic means to afford an indication of synchronization of the motor and A. C. line and of the actual speed.

Yet another object of the invention is to provide grid controlled electronic means operated by an A. C. line to drive a direct current motor, or other direct current operated mechanism, having an alternator driven by said motor, or other mechanism, and combined manual and automatic means to change the speed of the motor and bring it into synchronization with the line frequency at the desired speed, said automatic means comprising electronic means responsive to a phase difference between the frequency of the line and of the alternator output to control the grids of the electronic driving means, said electronic phase difference responsive means acting to momentarily reduce to zero the controlling voltage between each cycle of the line voltage to enable control to be continuously effective.

Still another object of the invention is to provide a tachometer calibrator including a D. C. motor provided with means for controlling the speed thereof arranged according to this invention, the motor shaft driving the test calibrator, a reference tachometer, and a small alternator, an electronic valve controlled circuit being provided including a stroboscopic device, which acts together with a marked drum mounted on said shaft, to constitute an accurate and sensitive instrument.

Yet another object of the invention is to provide calibration apparatus for tachometers in which the speed of a drive shaft is checked initially by a reference tachometer driven from the same shaft as a tachometer being tested but the reading of the instrument is subject to accurate check by a stroboscopic device also driven by the drive shaft referred to.

Yet another object of the invention is to provide in a variable control for D. C. operated mechanism, an electronic control means enabling the operator to obtain "lock-in" or synchronism with the A. C. power line frequency with a desired degree of sharpness.

Still a further object of the invention is to control the speed of two or more adjustable speed D. C. motors by an electronic control circuit furnished with A. C. voltage from an alternator mechanically coupled to one of said D. C. motors which serves as a master.

Still further objects and features of the invention may hereinafter appear in the following specification and accompanying drawings.

The invention is described and illustrated as embodied in a tachometer calibrator which has been constructed and put in use with very satisfactory results, but it will be obvious to those skilled in the art that various changes and modifications may be made in the illustrative embodiment of the invention without departing from the scope of the invention as defined by the appended claims.

In the accompanying drawings, in which identical numerals indicate identical parts, Figure 1 is a front view of the tachometer calibrator mounted in two separate housings, A and B.

Figure 2 is a wiring diagram of the parts contained in housing B of the calibrator.

Figure 3 is a continuation of the diagram of Figure 2.

Figure 5 is a diagram showing the effect of decreasing speed of an alternator coupled to a motor and generating voltage utilized in an automatic control circuit to hold the speed of the motor to a desired value.

Figure 6 is a diagram showing the effect of the alternator generated voltage when the frequency is in synchronism with the line frequency.

Figure 7 is a diagram showing the effect of the alternator generated voltage when the motor runs faster than the desired speed.

Figure 8 is a diagram showing the rectified and periodically interrupted output of the automatic control circuit under the conditions shown in Figures 5, 6, and 7.

Figure 4:
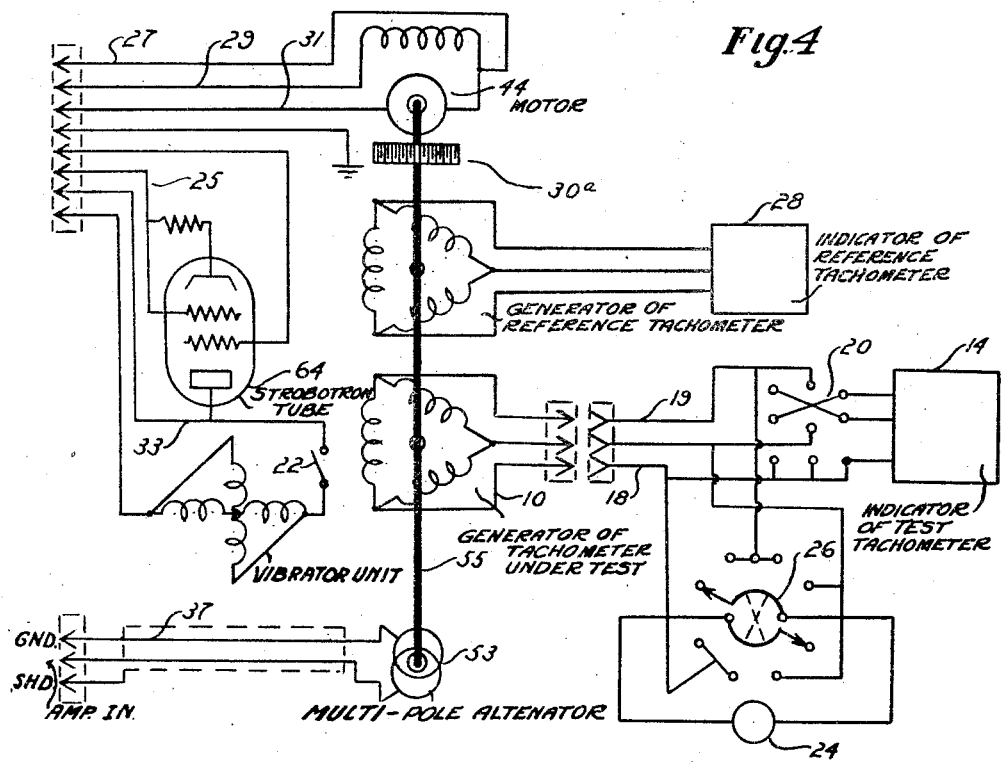
Figure 4 is a wiring diagram of the parts contained in housing A.

Figure 9 is a diagram showing the manual control of the firing point of the driving tubes for the D. C. motor or other D. C. operated mechanism with the automatic fine control superimposed thereon, the conditions being those of Figures 5, 6, and 7.

The general arrangement of the tachometer calibrator in a form which has proved convenient in use will first be described.

In the drawings heater element circuits are not shown.

Figure 1:
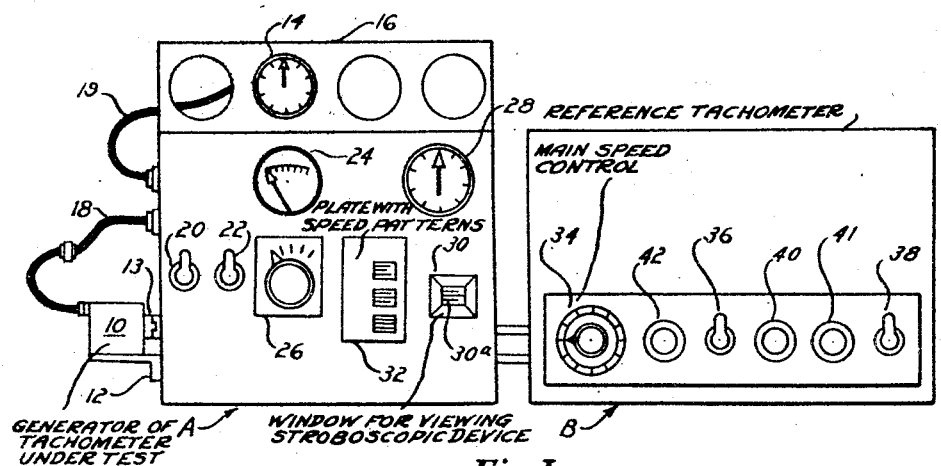

Referring to Figure 1, the calibrator consists of two units, one, unit A, containing a drive motor rotating a shaft to which the tachometer generator is connected, and a second, unit B, containing the controls and power supply for operating the drive motor, the two units being interconnected by two cables. The tachometer generator 10 undergoing test is shown mounted on a bracket 12 at the left of unit A and connected to the drive shaft of the drive motor by a coupling 13. The indicator 14 of the tachometer being tested is mounted conveniently in a panel 16 and is connected to the tachometer generator 10 by cables 18 and 19. The panel 16, which is carried above unit A, may be used to test more than one indicator simultaneously. Switch 20 shown at the left side of unit A serves to reverse the polarity of the tachometer generator should it be found reversed at the start of the test, a condition which may arise under working conditions. A second switch 22 controls a vibrator unit which may be used to vibrate the indicator support should the tachometer indicator hand show a tendency to stick. An A. C. voltmeter 24 is arranged above a four-way switch 26 and enables the voltage of each phase of a tachometer having a three-phase generator to be separately tested for defects, which would be indicated by discrepancies in the voltmeter reading of the separate phases. To the right of voltmeter 24 is shown the indicator 28 of a reference tachometer 29 which is connected to the same rotating shaft as is the tachometer generator under test, and is used to indicate the approximate speed of the drive motor, as obtained by turning a speed control knob 34 (on unit B) while the exact speed is obtained by a to-and-fro turning or hunting of the speed control knob until "lock in" at line frequency is indicated by the stroboscopic device which is observed through a window 30, arranged below the reference tachometer. The stroboscopic device comprises a strobotron tube 64 and a drum (Figure 4) mounted on the motor shaft and carrying markings 30a, which show a pattern, indicating the speed when read with the reference tachometer, to within 50, and if desired, 25 revolutions per minute. The pattern shown is different for even 100 revolutions, odd 100 revolutions and 50 revolutions per minute. These patterns and corresponding speeds are marked on a plate 32 positioned beside the viewing aperture of the stroboscopic device.

The unit B carries at the left the main speed control knob 34, already referred to, and a switch 36, to the right of the knob, connects the motor to the power supply circuit of the device. A second switch 38 connects the power supply circuit of the tachometer calibrator to an A. C. power line and a red light 40 indicates when the line switch is in the "on" position. A 10 ampere fuse, arranged in the power supply circuit is shown at 41. The power circuit of the motor includes thyratron tubes and a green light is shown at 42 which lights when these tubes are operating.

The parts contained in housing B will now be described. A ¼ H. P. D. C. shunt wound motor 44 (Figure 4) with a fixed field is supplied with armature current by a pair of thyratrons 45 (Figure 2) arranged in push pull, and the motor field is supplied by a power tube 86. These tubes obtain power from a 110 volt transformer 46 connected across a 50 cycle A. C. power line. The grids of the thyratrons 45 are "fired" by a combined A. C. and pulsating D. C. voltage. The A. C. component is manually controlled and the D. C. component is automatically controlled, the two controls being independent of one another.

The manual control consists of a bridge type phase shifting circuit using two condensers 48, 50 and two variable resistors 52, 54, which are operated by the main control knob 34. The resistors determine the upper limit of the speed of the motor 44 but can be changed if a higher or lower upper speed limit is required than that at which the motor is being operated.

The automatic control is obtained by changing the bias of the thyratrons 45 as may be required by a tendency of motor 44 to change speed, as follows:

A thirty pole alternator 53, mounted on the motor driven shaft 55, generates A. C. voltage whose frequency is proportional to speed. This voltage is fed to an amplifier (Figure 3) consisting of a double electron tube 56, connected as a phase inverter, followed by tube 58, the tubes being arranged in push pull. The gain of the amplifier is kept constant by using automatic volume control obtained by using a portion of the output of a full wave rectifying tube 61. The tube 61 has its plates connected through a resistor network to the midpoint of the secondary of transformer 59, the primary of which is traversed by the plate output of tube 58. The portion of the output of tube 61 utilized is fed back to the grids of the tube 56 through lead 57.

The main output of the amplifier supplies voltage to the plates of two thyratron tubes 60 arranged in push pull. The grids of these tubes are "fired" at the regular 50 cycle line frequency which is used as the time standard of the calibrator, by voltage from the cathode circuit of the Strobotron light tube 64 (Figure 4) impressed on the grids of the tubes 60 through lead 25, to obtain a steep wave front of the output voltage. Since the center tap of transformer 59 is grounded, a circuit is established from each plate in each tube 60 through the center tap, thence to ground, and thence through the grounded resistors 62 to the cathodes of the tube 60, the construction thus providing a D. C. return path through which the tubes may fire. It will be noted that the anode circuit of the Strobotron tube is connected to one side of the A. C. power line by lead 33. Frequency of the A. C. voltage delivered by the amplifier to the plates of Thyratron tubes 60 is proportioned to the speed of the alternator 53 and therefore the phase relation of the plate voltage and the grid firing voltage of tubes 60, and therefore the output of the tubes, will correspondingly vary with the speed of the alternator. The voltage across a resistor 62 in the cathode circuit of tubes 60 will accordingly change proportionally with a shift in phase of the two voltages above referred to, being greater if the alternator leads, and less if it lags, than when in step with the frequency of the line. This voltage drop is utilized to determine the amount of "lock-in" by the adjustment of movable contact 63. The position of arm 63 can be adjusted by any suitable means (not shown). The greater the voltage drop utilized, the sharper or greater will be the amount of "lock-in" obtained. A high degree of "lock-in" requires less "hunting" by back and forth turning of speed control knob 34 to approximately the exact speed, while the reverse is the case with a lessened amount of "lock-in."

Synchronism of the alternator frequency with the frequency of the line by adjusting the speed of the motor is effected by passing the voltage taken off by arm 63 through one unit of a double rectifier tube 72 to be impressed on a condenser 74. The voltage across this condenser is also impressed on the grid 76a of one unit of a double tube 76. The grid bias of Thyratron tubes 45 is controlled by the voltage drop across the cathode resistor 78 of the tube 76 which is impressed on the grids of tubes 45 by lead 39, thereby controlling the amount of time the Thyratrons are fired in each cycle of operations. In order to balance out surges due to sudden changes in the control voltage and to thereafter bring the new controlling voltage to a steady value, an anti-hunt network is electrically interposed between the condenser path 39, resistor 78, and the cathodes of tube 76. This network comprises the disclosed series-parallel arrangement of resistances 101 and 102 coacting with capacitance 103. By virtue of this construction, a change in the control voltage at 76a will initially appear on conductor 39 with the same magnitude of change. The ensuing gradual charging of conductor 103 will slowly reduce the amount of charge to a steady final value. The relationship between resistors 101 and 102 and condenser 103 is originally so established as to modify the control voltage at 76a sufficiently to compensate for the lag inherent in the balance of the motor control.

The condenser 74 is discharged just previous to the firing of the tubes 60 by means of the second unit of tube 76, the grid 76b of which is controlled by pulsating D. C. obtained through lead 26 from the 110 volt line by means of a secondary winding 43 of the line transformer 46, and rectified by the second unit of the rectifying tube 72, and the well-known coupling arrangement shown.

Power supply to the Strobotron tube 64 (Figure 4) is indicated at 67 (Figure 2). Power supply 89 (Figure 3) supplies the amplifier and control tubes above referred to.

An electronic tube 96 with filament on the same conductors as the tubes 45 is arranged to act as an inverse voltage suppressor as is common practice in circuits including Thyratron tubes feeding an inductive load.

In Figures 5 to 7 the effect of change of speed of the alternator on the voltage output of the automatic control is shown, the rippling line 66 representing the alternator voltage, the height of the vertical line 68 indicating the voltage at the firing point of the Thyratron tubes 60 of the automatic control which are fired at the A. C. line frequency.

In Figure 5, it will be seen that slowing down of the alternator results in a greater voltage output of the automatic control as compared with the voltage when the alternator frequency is in step with the line voltage (which condition is shown in Figure 6) while when the alternator is running ahead the voltage at the instant of firing of the thyratrons of the control circuit is less than when the alternator is in step with the A. C. line frequency.

The pulsating voltage from the thyratrons 60 after rectification, is shown in Figure 8 as a horizontal line at different levels according to the voltage resulting from the conditions represented in Figures 5, 6, and 7.

It will be noted that the voltage is reduced periodically to zero at points 70 just previous to the firing point of the thyratrons 60, due to the discharging of condenser 74 at this instant by the action of the second element of tube 76, this action insuring the correct setting up of the control voltage between each firing point of the thyratrons 60.

The effect of the automatic control voltage is to adjust the level of the firing voltage of the Thyratron tubes 45 supplying the armature and field of the D. C. motor to automatically correct any tendency of the D. C. motor to change speed, whereas the effect of the manual control is to effect phase shift of the plate and grid voltage of the Thyratron tubes supplying the D. C. motor and thus adjust the speed of the motor. The control of the grid voltage is represented in Figure 9, in which the firing point of the tubes is represented as shifted to the right so that the output of the thyratron is considerably less than maximum.

In Figure 9 the effect of the automatic control voltage is shown, the diagram showing half wave operation of the FG57 tubes 45 for the sake of clarity, though actually the action is not drawn to scale. Grid voltages and plate voltages are in push pull. The full line represents the grid voltage of the tubes 45 when the motor is running at the proper speed, while the broken line indicates the grid voltage as modified by the automatic control when the motor is lagging and the dot-dash indicates the grid voltage when the motor is leading.

The effect of the manual control of the thyratrons is to vary the phase relation of the grid and anode voltages, the tubes 45 delivering plate current as soon as the applied grid voltage curve cuts the curve of grid firing voltage, the value of the average current passed by the tube being graphically shown by the varying height of the vertical lines within the curve of plate voltage. Superimposed automatically on the manual control is the automatic control due to the varying voltage generated by the alternator when the motor tends to lag or lead as provided for by the circuit arrangement of the control circuit described.

Operation

In the initial setting of the tachometer calibrator, the line switch 38 and motor switch 36 will be in the "off" position and main speed control knob 34 will be turned as far as possible to the left which is the "off" position. To operate the machine, the power switch 38 is first turned on, line current will then flow through the primary of power transformer 46, a plurality of secondary windings providing the power for the various filament and plate circuits of the apparatus. Initially the only circuit complete at this time is that of a time delay device 82, to guard against the thyratrons being turned on before the elements thereof have attained their operating values. The time delay device may be of the kind in which an electronic tube is arranged in a circuit including a condenser which is charged by a differential potential, which in the case of this apparatus preferably takes about five minutes. After the condenser is charged to the proper value the circuit passes a current through a relay 84 which closes contacts 84b, 84c, lighting green light 42 and placing the operating circuit in condition to be completed when motor switch 36 is moved to the "on" position. When this has been done the Thyratron tubes 45 obtain their plate voltage from a winding of transformer 46 and the rectified plate current from the tubes is supplied to the armature of the D. C. motor by lead 27 and return lead 31. Power tube 86 obtains plate voltage from transformer 46 and the rectified plate current from the tube 86 supplies the field of motor 44 by lead 27 and return 29. The generator 10 of the motor tachometer being tested, the generator of reference tachometer 28, and the 30 pole alternator 53 are all mounted on the shaft 55 of the motor 44. The speed of shaft 55 is successively set to a plurality of values accurately determined by the drive control means of the calibrator and the readings of the test tachometer noted as compared with the known speed. In setting the shaft to a particular speed, control knob 34 is used to get the speed as shown by the reference tachometer as near to the desired value as possible, but the fine adjustment of the speed is effected by automatic means working independently of the manual control which is turned slowly back and forth while watching the patterns shown by the stroboscopic device 30. These patterns will not be sharply defined until the frequency of the alternator output and therefore, its speed and that of the motor and tachometer under test, is synchronized exactly with the A. C. power line frequency, the exact speed (depending on the power line) being known by combining the readings of the test tachometer with an interpretation of the stroboscopic pattern.

While the invention as applied to a tachometer calibrator has been described as constructed for use on a 50 cycle A. C. line, it can be furnished or readily adapted for use on a 60 cycle line. The 30 pole alternator in this case would be substituted by a 36 pole alternator and the drum provided with markings 30a is substituted by another carrying a larger number of markings which would, however, give the same patterns indicative of a condition of synchronism.

It will be obvious that the method and means for obtaining synchronism of an A. C., D. C., or D. C. motor which may be driven at any desired speed, with a time standard, such as that of an A. C. power line, has a wide field of use in industry in which electronic control of operations is being increasingly utilized.

Various modifications and embodiments of my invention will be apparent to those skilled in the art and I claim as my invention all such modifications as fall within the scope of the appended claims.

I claim:

1. An electronic tube control system for adjustable speed D. C. electrical driving means drawing power from an A. C. power line of substantially constant frequency, comprising: a part driven by said electrical driving means; an electric generator driven at a fixed ratio to the speed of said part and generating voltage at a frequency having a definite ratio to the frequency of the line, speed changing means effective to bring the speed of said electrical driving means approximately to a desired value; electronic tube control means operated in response to any phase difference between the voltage frequency of said generator and that of the line to generate a voltage cooperating with the speed changing means to bring the speed of said electrical driving means to the precise value desired, said electronic tube control means thereafter acting automatically to maintain constant speed of said electrical driving means until the speed changing means are again operated; a circuit containing further electronic tube control means and a condenser acting to maintain control during the interval between cycles of the A. C. power line; and electronic means acting to short out said condenser just prior to the operation of said electronic tube control means.

2. An electrical control system for an adjustable speed D. C. motor drawing power from an A. C. line of substantially constant frequency, comprising: a part driven by said motor; an electric generator providing a voltage having a frequency which is a function of the speed of said part and having a definite ratio to the frequency of the A. C. line, means for bringing the speed of said motor approximately to a desired speed; electronic tube control means responsive to phase difference between the voltage of said generator and that of the line to generate voltage acting in conjunction with the speed changing means to bring the speed of the motor to the precise value desired, said electronic tube control means thereafter acting automatically to maintain said speed until the speed changing means are again operated; further electronic tube means and a condenser in the output circuit of the electronic tube control means acting to maintain control during the interval between cycles of the A. C. power line, and electronic means acting to short out said condenser just prior to the operation of said electronic tube control means.

3. An electrical control system for an adjustable speed D. C. motor drowing power from an A. C. line of substantially constant frequency, comprising: a shaft driven by said motor, an alternator directly driven by said shaft and having a number of poles such as to generate a voltage having a frequency bearing a definite ratio to the frequency of the A. C. line, means for bringing the speed of said motor approximately to a desired speed; electronic tube control means responsive to phase difference between the voltage of said generator and that of the line to generate a voltage cooperating with the speed changing means to bring the speed of the motor to the precise value desired, said electronic tube control means thereafter acting automatically to maintain said speed until the speed changing means are again operated; further electronic means and a condenser in the output circuit of the electronic tube control means acting to maintain control during the interval between cycles of the A. C. power line, and electronic means acting to short out said condenser just prior to the operation of said electronic tube control means.

4. An electrical control system for an adjustable speed D. C. motor drawing power from an A. C. line of substantially constant frequency, comprising: electronic tube means including grid controlled thyratrons operating from the A. C. line to furnish power to said motor; an alternator mounted on the motor shaft and having a number of poles such as to generate a voltage having a definite ratio to the frequency of the A. C. line; a phase shifting network to vary the output of said thyratrons and thereby control the speed of the motor; a control circuit including grid controlled electronic tubes having the A. C. line frequency impressed upon the grids and the frequency of the generator voltage impressed upon the plates, phase difference between the generator and line frequencies causing generation of a control voltage proportional to the amount and direction of said phase difference; leads impressing said control voltage on said phase shifting network to vary the grid bias of said thyratrons to vary the power furnished to the motor to bring the speed thereof to a desired value; further electronic tube means and a condenser in the output circuit of the electronic tube control means acting to maintain control during the interval between cycles of the A. C. power line; and electronic means acting to short out said condenser just prior to the operation of said electronic tube control means.

5. An electrical control system for an adjustable speed D. C. motor drawing power from an A. C. line of substantially constant frequency comprising: electronic tubes including grid controlled thyratrons operating from the A. C. line to furnish power to said motor; an alternator mounted on the motor shaft and having a number of poles such as to generate a voltage having a frequency bearing a definite ratio to the frequency of the A. C. power line; a phase shifting network to vary the output of said thyratrons; a control circuit including grid controlled electronic tubes having the A. C. line frequency impressed upon the grids and the frequency of the generator impressed upon the plates, a phase difference between the generator and line voltage generating a voltage proportional to the amount and direction of said phase difference, leads impressing said voltage on said phase shifting network to vary the grid bias of said thyratrons to vary the power furnished to the motor to bring the speed of said motor to a desired value, means including a variable resistor in the cathode circuit of said grid controlled electronic tubes in the control circuit to enable the amount of voltage used to cooperate with the phase shifting network to be adjusted, further electronic tube means and a condenser in the output circuit of the electronic tube control means acting to maintain control during the interval between cycles of the A. C. power line; and electronic means acting to short out said condenser just prior to the operation of said electronic tube control means.

6. An electronic tube control system for adjustable speed D. C. electrical driving means drawing power from an A. C. power line of substantially constant frequency, as defined in claim 1, comprising: means for adjusting the amount of control voltage drawn from said first mentioned electronic tube means to be applied to the electrical driving means and thereby determine sharpness of the synchronizing action obtained.

7. A method of regulating the speed of a D. C. driving means driven from an A. C. line comprising; supplying rectified current to said motor, generating a small A. C. voltage of a frequency having a definite ratio to the frequency of said line voltage and to the speed of said motor, generating a control voltage fluctuating in accordance with any phase difference between said generated voltage and the line voltage due to fluctuations in the speed of the D. C. driving means, rectifying said voltage, and supplying said rectified voltage to said motor so as to increase the speed of the motor if it tends to reduce its speed and to reduce the motor speed if it tends to increase its speed.

8. An electronic tube control system for adjustable speed D. C. electrical driving means drawing power from an A. C. power line of substantially constant frequency, comprising: a part driven by said electrical driving means; an electric generator driven at a fixed ratio to the speed of said part and generating voltage at a frequency having a definite ratio to the frequency of the line, speed changing means effective to bring the speed of said electrical driving means approximately to a desired value; electronic tube control means operated in response to any phase difference between the voltage frequency of said generator and that of the line to generate a voltage cooperating with the speed changing means to bring the speed of said electrical driving means to the precise value desired, said electronic tube control means thereafter acting automatically to maintain constant speed of said electrical driving means until the speed changing means are again operated; further electronic tube means and a condenser in the output circuit of the electronic tube control means acting to maintain control during the interval between cycles of the A. C. power line; and an anti-hunt network comprising a series parallel arrangement of resistance and capacity in the cathode circuit of said further electronic tube means, said network being effective to balance out surges due to sudden changes in the control voltage and thereafter to bring the new control voltage to a steady value.

9. An electrical control system for an adjustable speed D. C. motor as defined in claim 3 additionally comprising: an anti-hunt network comprising a series parallel arrangement of resistance and capacity in the cathode circuit of said further electronic tube means, said network being effective to balance out surges due to sudden changes in the control voltage and thereafter to bring the new control voltage to a steady value.

10. An electrical control system for an adjustable speed D. C. motor as defined in claim 2 additionally comprising a tachometer driven from the motor shaft, a cylindrical part mounted on the motor shaft and furnished with markings around the periphery thereof, and a stroboscopic device furnished with power from said A. C. power line and furnishing, in cooperation with said markings, an indication of the true speed of said motor.

11. An electrical control system for an adjustable speed D. C. motor as defined in claim 4 additionally comprising a tachometer driven from the motor shaft, a cylindrical part mounted on the motor shaft and furnished with markings around the periphery thereof, and a stroboscopic device furnished with power from said A. C. power line and furnishing, in cooperation with said markings, an indication of the true speed of said motor.

12. An electrical control system for an adjustable speed D. C. motor as defined in claim 4 additionally comprising a tachometer driven from the motor shaft, a cylindrical part mounted on the motor shaft and furnished with markings around the periphery thereof, and a stroboscopic device furnished with power from said A. C. power line and furnishing, in cooperation with said markings, an indication of the true speed of said motor, a strobotron tube or other tube of similar electrical characteristics comprised in the stroboscopic device, and a lead connecting the cathode of said tube with the grid circuit of said grid controlled electronic tubes in the control circuit in order to obtain a steep wave front of the control voltage of said control circuit.

13. An electrical control system for an adjustable speed D. C. motor as defined by claim 5 additionally comprising: an anti-hunt network comprising a series parallel arrangement of resistance and capacity in the cathode circuit of said further electronic tube means, said network being effective to balance out surges due to sudden changes in the control voltage and thereafter to bring the new control voltage to a steady value.

14. An electrical control system for an adjustable speed D. C. motor as defined by claim 5 additionally comprising a tachometer driven from the motor shaft, a cylindrical part mounted on the motor shaft and furnished with markings around the periphery thereof, and a stroboscopic device furnished with power from said A. C. power line and furnishing, in cooperation with said markings, an indication of the true speed of said motor.

15. An electrical control system for an adjustable speed D. C. motor as defined by claim 5 additionally comprising a tachometer driven from the motor shaft, a cylindrical part mounted on the motor shaft and furnished with markings around the periphery thereof, and a stroboscopic device furnished with power from said A. C. power line and furnishing, in cooperation with said markings, an indication of the true speed of said motor, a strobotron tube comprised in the stroboscopic device, and a lead connecting the cathode of said tube with the grid circuit of said grid controlled electronic tubes in the control circuit in order to obtain a steep wave front of the control voltage of said control circuit.

16. An electrical control system for an adjustable speed D. C. motor as defined in claim 4 additionally comprising: an anti-hunt network comprising a series parallel arrangement of resistance and capacity in the cathode circuit of said further electronic tube means, said network being effective to balance out surges due to sudden changes in the control voltage and thereafter to bring the new control voltage to a steady value, and a tachometer driven from the motor shaft, a cylindrical part mounted on the motor shaft and furnished with markings around the periphery thereof, and a stroboscopic device furnished with power from said A. C. power line and furnishing, in cooperation with said markings, an indication of the true speed of said motor.

17. An electrical control system for an adjustable speed D. C. motor as defined by claim 5 additionally comprising: an anti-hunt network comprising a series parallel arrangement of resistance and capacity in the cathode circuit of said further electronic tube means, said network being effective to balance out surges due to sudden changes in the control voltage and thereafter to bring the new control voltage to a steady value, a tachometer driven from the motor shaft, a cylindrical part mounted on the motor shaft and furnished with markings around the periphery thereof, and a stroboscopic device furnished with power from said A. C. power line and furnishing, in cooperation with said markings, an indication of the true speed of said motor.

18. An electrical control system for an adjustable speed D. C. motor as defined by claim 5 additionally comprising: an anti-hunt network comprising a series parallel arrangement of resistance and capacity in the cathode circuit of said further electronic tube means, said network being effective to balance out surges due to sudden changes in the control voltage and thereafter to bring the new control voltage to a steady value, a tachometer driven from the motor shaft, a cylindrical part mounted on the motor shaft and furnished with markings around the periphery thereof, and a stroboscopic device furnished with power from said A. C. power line and furnishing, in coopera-tion with said markings, an indication of the true speed of said motor, a strobotron tube comprised in the stroboscopic device, and a lead connecting the cathode of said tube with the grid circuit of said grid controlled electronic tubes in the control circuit in order to obtain a steep wave front of the control voltage of said control circuit.

19. A method of regulating the speed of direct current driving means supplied from an A. C. line by electronic means comprising; adjusting the speed of said driving means by a phase shifting control for said electronic means and providing a fine adjustment to bring said driving means into synchronism with the A. C. line and automatically maintain the speed in synchronism by generating an alternating control current at a frequency having a definite ratio to the speed of the driving means, any change in frequency of said alternating current acting to generate a voltage applied in addition to the phase shifting network to vary the firing voltage of said electronic means in a manner to correct any tendency of the direct current driving means to change from the desired speed.

20. A method of regulating the speed of direct current driving means as set forth in claim 19 and comprising in addition; momentarily reducing the value of the control to zero at a definite point in each cycle of the A. C. line.

21. A tachometer calibrator comprising: a direct current motor; an electronic circuit for supplying direct current to said motor from an A. C. line; a manually operated phase shifting circuit for adjusting the speed of the motor by varying the output of said electronic circuit; a shaft driven by said motor, the generator of the tachometer to be tested being coupled to said shaft; a support for the indicator of said tachometer; a reference tachometer driven by said shaft; an alternator driven by said shaft; and an electronic circuit acting to generate a control voltage proportional to any difference in harmonically related phase between the voltage generated by the alternator and the A. C. line voltage, the control voltage being applied, in addition to the output of the electronic circuit operating the motor, so as to automatically hold the speed thereof to a desired value until the manually operated speed adjusting means are again operated to set the motor to a different speed.

22. A tachometer calibrator as set forth in claim 21 and in addition comprising; a drum mounted on the shaft driven by said motor, said drum carrying markings on its outer periphery; a stroboscopic light acting with said markings to show a pattern indicating when the speed of the motor is an even hundred, odd hundred, or a speed 50 revolutions intermediate an even and odd hundred revolutions, whereby the actual speed at which the tachometer generator is being driven by said motor is determined.

23. An electrical control system for a plurality of adjustable speed D. C. motors drawing power from an A. C. line of substantially constant frequency comprising: electronic tube means including grid controlled thyratrons operating from the A. C. line to furnish power to each of said motors; an alternator mounted on the shaft of each motor and having a number of poles such as to generate a voltage having a definite ratio to the frequency of the A. C. line; a phase shifting network to vary the output of said thyratrons and thereby control the speed of the motors; a control circuit comprising grid controlled electronic tubes having the A. C. line frequency impressed upon the grids and the frequency of the generator voltage impressed upon the plates, phase difference between the generator and line frequencies causing generation of a control voltage proportional to the amount and direction of said phase difference; leads impressing said control voltage on said phase shifting network to vary the grid bias of said thyratrons to vary the power furnished to the motor to bring the speed thereof to a desired value; further electronic tube means and a condenser in the output circuit of the electronic tube control means acting to maintain control during the interval between cycles of the A. C. power line; and electronic means acting to short out said condenser just prior to the operation of said electronic tube control means.

24. A control system for regulating the speed of a D. C. driving means driven from an A. C. line comprising: means supplying rectified current to said motor; means generating a small A. C. voltage of a frequency having a definite ratio to the frequency of said line voltage and to the speed of said motor; means generating a control voltage fluctuating in accordance with any phase difference between said generated voltage and the line voltage due to fluctuations in the speed of the D. C. driving means; means for rectifying said voltage; and a circuit for supplying said rectified voltage to said motor so as to increase the speed of the motor if it tends to reduce its speed and to reduce the motor speed if it tends to increase its speed.

25. A control system for regulating the speed of direct current driving means supplied from an A. C. line by electronic means comprising: a phase shifting control for said electronic means for adjusting the speed of said driving means; means providing a fine adjustment to bring said driving means into synchronism with the A. C. line and automatically maintain the speed of the direct current driving means in synchronism with the A. C. line, said means comprising means generating an alternating control current at a frequency having a definite ratio to the speed of the direct current driving means, any change in frequency of said alternating current acting to generate a voltage; and a circuit by which said voltage is applied in addition to the phase shifting network controlling the electronic means, to vary the firing voltage of said electronic means in a manner to correct any tendency of the direct current driving means to change from the desired speed.

26. A control system for regulating the speed of direct current driving means as set forth in claim 24 and comprising in addition: means acting to momentarily reduce the value of the control current to zero at a definite point in each cycle of the A. C. line.

DELBERT J. WARD.